United States Patent
Hung et al.

(10) Patent No.: US 10,338,658 B2
(45) Date of Patent: Jul. 2, 2019

(54) POWER SUPPLY UNIT HAVING AN EXTENDED HOLD-UP TIME

(71) Applicant: DELL PRODUCTS, L.P., Round Rock, TX (US)

(72) Inventors: Tsai-Fu Hung, Taipei (TW); Shih-Chieh Wang, Taipei (TW); Kuang-Hao Chou, Taipei (TW); Dennis A. Martin, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/154,450

(22) Filed: May 13, 2016

(65) Prior Publication Data

US 2017/0329380 A1 Nov. 16, 2017

(51) Int. Cl.
| | |
|---|---|
| *G06F 1/30* | (2006.01) |
| *H02M 1/08* | (2006.01) |
| *H02M 1/42* | (2007.01) |
| *H02M 1/44* | (2007.01) |
| *H02M 3/04* | (2006.01) |
| *H02M 1/00* | (2006.01) |
| *H02M 7/06* | (2006.01) |
| *H02M 1/36* | (2007.01) |
| *H02M 3/158* | (2006.01) |

(52) U.S. Cl.
CPC ............... *G06F 1/30* (2013.01); *H02M 1/36* (2013.01); *H02M 1/4225* (2013.01); *H02M 1/44* (2013.01); *H02M 7/06* (2013.01); *H02M 3/1588* (2013.01); *H02M 2001/0096* (2013.01); *Y02B 70/126* (2013.01); *Y02B 70/1466* (2013.01)

(58) Field of Classification Search
CPC .. H02M 2001/0096; H02M 3/07; H02M 1/08; H02M 1/088; H02M 1/36; H02M 1/4258; H02M 3/02; H02M 1/44; H02M 1/42; H02M 3/04; H02M 7/06; H02M 2001/0009; H02M 1/4225; G06F 1/30
See application file for complete search history.

(56) References Cited

U.S. PATENT DOCUMENTS

| | | | | | |
|---|---|---|---|---|---|
| 5,258,901 | A | * | 11/1993 | Fraidlin | .................. H02J 9/061 307/64 |
| 2005/0201123 | A1 | * | 9/2005 | Usui | ................. H02M 3/33507 363/16 |

(Continued)

*Primary Examiner* — Gustavo A Rosario-Benitez
(74) *Attorney, Agent, or Firm* — Isidore PLLC

(57) ABSTRACT

A power supply for an information handling system includes a rectifier circuit that is coupled to a power factor correction circuit. The power factor correction circuit includes a bulk capacitor. An extended hold-up capacitor is coupled in parallel to the bulk capacitor, via an electronic switch. The electronic switch has a first terminal coupled to the bulk capacitor and a second terminal coupled to the extended hold-up capacitor. A control circuit is coupled to a third terminal of the electronic switch and controls the operation of the electronic switch. An extended hold-up circuit is coupled to the extended hold-up capacitor and an output terminal of the power factor correction circuit. A digital signal controller is coupled to the extended hold-up circuit. The digital signal controller controls the operation of the extended hold-up circuit, and a DC to DC converter is coupled to the extended hold-up circuit.

17 Claims, 8 Drawing Sheets

(56) References Cited

U.S. PATENT DOCUMENTS

| | | | |
|---|---|---|---|
| 2009/0097286 A1 | 4/2009 | Lin | |
| 2009/0230771 A1* | 9/2009 | De | H02M 1/36 307/44 |
| 2010/0014330 A1* | 1/2010 | Chang | H02M 1/4225 363/89 |
| 2011/0241637 A1* | 10/2011 | Parker | H02J 9/061 323/282 |
| 2012/0051097 A1* | 3/2012 | Zhang | H02M 1/4225 363/21.07 |
| 2013/0051101 A1 | 2/2013 | Dang | |
| 2013/0070497 A1* | 3/2013 | Liquicia | H02M 1/32 363/126 |
| 2014/0108846 A1* | 4/2014 | Berke | G06F 13/4221 713/340 |
| 2014/0254201 A1 | 9/2014 | Shih | |
| 2015/0171664 A1 | 6/2015 | Liu | |
| 2016/0359359 A1* | 12/2016 | Hsu | H02M 1/32 |

* cited by examiner

POWER SUPPLY UNIT HAVING AN EXTENDED HOLD-UP TIME

BACKGROUND

1. Technical Field

The present disclosure generally relates to information handling systems and in particular to a power supply unit having an extended hold-up time.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of redundant alternating current to direct current (AC-DC) or direct current to direct current (DC-DC) power supplies that provide regulated voltages to different loads. The load current may vary across a broad range from relatively high peak currents to very low stable currents. The AC-DC and DC-DC power supplies used in servers typically should be designed for a large range of server configurations and generally need to be designed to handle the full load of the server safely. The power supplies also need to be optimized for efficiency, size, and cost.

Hold-up time is an important characteristic of AC-DC power supplies. When the line power is reduced or interrupted, the AC-DC power supply has to supply DC power for a long enough period of time to allow (1) the information handling system to store critical data and orderly terminate operations and/or (2) a backup battery or power system to start supplying power to the information handling system. Another characteristic of concern with AC-DC power supplies is re-rush current. When AC input power is restored after an interruption, a large current will flow into the power supply. If this current is too large, components within the power supply can be damaged.

BRIEF SUMMARY

Disclosed are a power supply and an information handling system (IHS) that provide an extended hold-up time for supplying power to the IHS and that minimize re-rush current when input power is re-connected after having been lost.

According to one embodiment, the power supply comprises a rectifier circuit and a power factor correction circuit that is coupled to the rectifier circuit. The power factor correction circuit includes a bulk capacitor. An extended hold-up capacitor is coupled in parallel to the bulk capacitor, via a first electronic switch. The first electronic switch has a first terminal coupled to the bulk capacitor and a second terminal coupled to the extended hold-up capacitor. A control circuit is coupled to a third terminal of the first electronic switch. The control circuit is operable to control the operation of the first electronic switch. An extended hold-up circuit is coupled to the extended hold-up capacitor and an output terminal of the power factor correction circuit. A digital signal controller is coupled to the extended hold-up circuit. The digital signal controller is operable to control the operation of the extended hold-up circuit. A DC to DC converter is coupled to the extended hold-up circuit. The power supply extends hold-up time and reduces re-rush current when input power is re-connected after having been lost.

Also disclosed is an IHS that comprises a processor and a power supply for providing power to the IHS. The power supply includes a rectifier circuit and a power factor correction circuit that is coupled to the rectifier circuit. The power factor correction circuit includes a bulk capacitor. An extended hold-up capacitor is coupled in parallel to the bulk capacitor, via a first electronic switch. The first electronic switch has a first terminal coupled to the bulk capacitor and a second terminal coupled to the extended hold-up capacitor. A control circuit is coupled to a third terminal of the first electronic switch. The control circuit is operable to control the operation of the first electronic switch. An extended hold-up circuit is coupled to the extended hold-up capacitor and an output terminal of the power factor correction circuit. A digital signal controller is coupled to the extended hold-up circuit. The digital signal controller is operable to control the operation of the extended hold-up circuit. A DC to DC converter is coupled to the extended hold-up circuit. The power supply extends hold-up time and reduces re-rush current when input power is re-connected after having been lost.

Also disclosed is a method for providing an extended hold-up time and reducing re-rush current for a power supply of an electronic device. The method includes providing a rectifier circuit and coupling a power factor correction circuit to the rectifier circuit. The power factor correction circuit includes a bulk capacitor. An extended hold-up capacitor is coupled in parallel to the bulk capacitor, via a first electronic switch. The first electronic switch has a first terminal coupled to the bulk capacitor and a second terminal coupled to the extended hold-up capacitor. A control circuit is coupled to a third terminal of the first electronic switch. The control circuit controls the operation of the first electronic switch. An extended hold-up circuit is coupled to the extended hold-up capacitor and to an output terminal of the power factor correction circuit. A digital signal controller is coupled to the extended hold-up circuit. The digital signal controller at least partially controls the operation of the extended hold-up circuit. A DC to DC converter is coupled to the extended hold-up circuit.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a power supply and an information handling system (IHS) that provide an extended hold-up time for supplying power to the IHS and reduced re-rush current.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
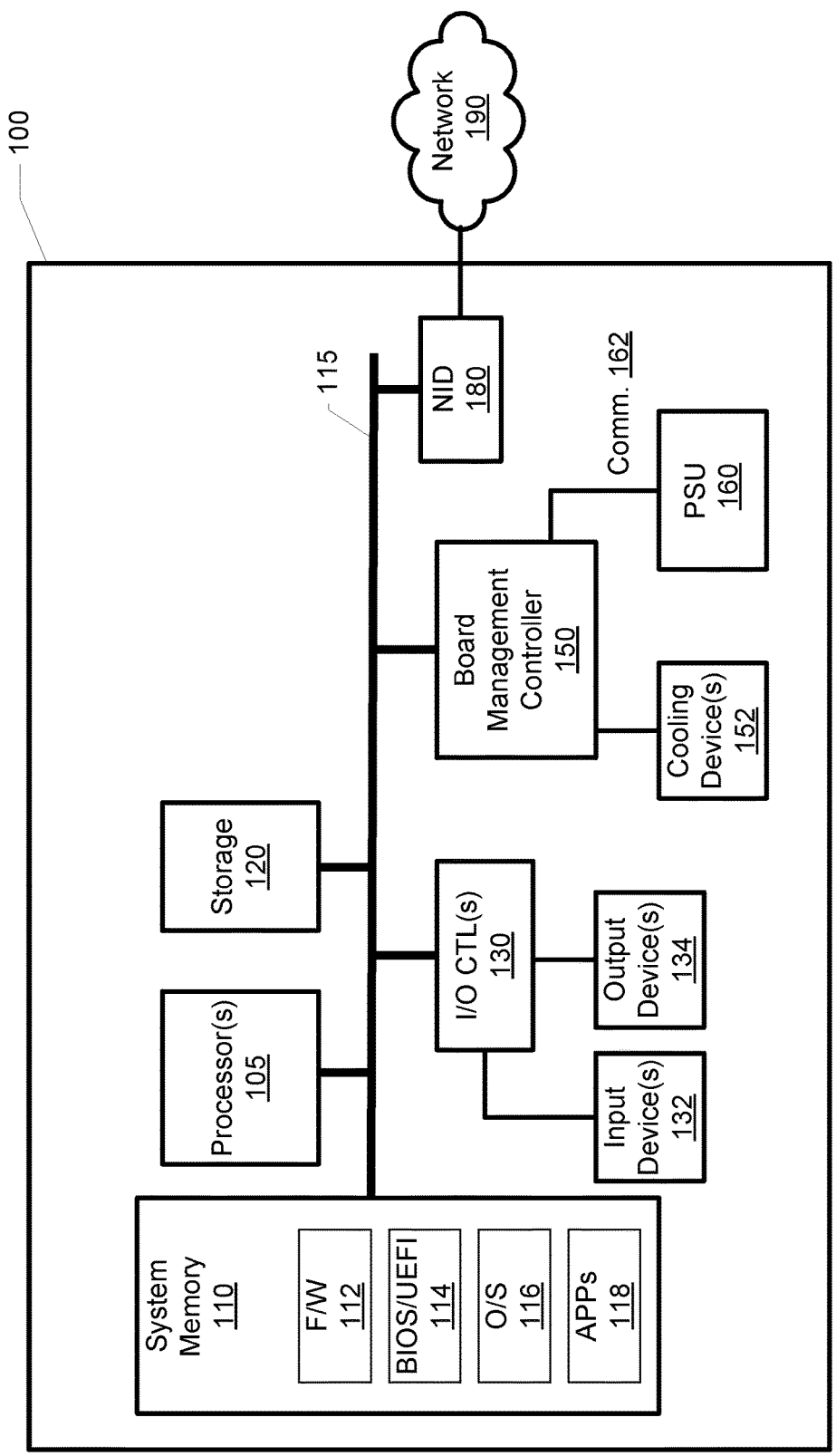
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and is thus illustrated as and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes a board management controller (BMC) 150 and one or more cooling devices (CD) 152. BMC 150 is in communication with processor(s) 105 and system memory 110, via system interconnect 115. BMC 150 contains components that control specific operations of IHS 100, such as power and thermal management. BMC 150 is in communication with CDs 152. CDs 152 can be one or more air movers, such as fans, that are positioned to cool IHS 100 during operation of IHS 100.

IHS 100 further includes one or more power supply units (PSU) 160. PSU 160 provides a regulated source of power to IHS 100. PSU 160 is communicatively coupled to BMC 150 by a communication bus 162. PSU 160 supplies power to each of the components within IHS 100 that require power via either one or more bus bars or power cables (not shown). BMC 150 can receive power supply data, parameters and settings from PSU 160 via communication bus 162. In one embodiment, several PSUs 160 can be mounted in IHS 100.

IHS 100 further comprises a network interface device (NID) 180. NID 180 enables IHS 100 to communicate and/or interface with other devices, services, and components that are located external to IHS 100. These devices, services, and components can interface with IHS 100 via an external network, such as example network 190, using one or more communication protocols. Network 190 can be a local area network, wide area network, personal area network, and the like, and the connection to and/or between network and IHS 100 can be wired or wireless or a combination thereof. For purposes of discussion, network 190 is indicated as a single collective component for simplicity. However, it is appreciated that network 190 can comprise one or more direct connections to other devices as well as a more complex set of interconnections as can exist within a wide area network, such as the Internet.

Figure 2:
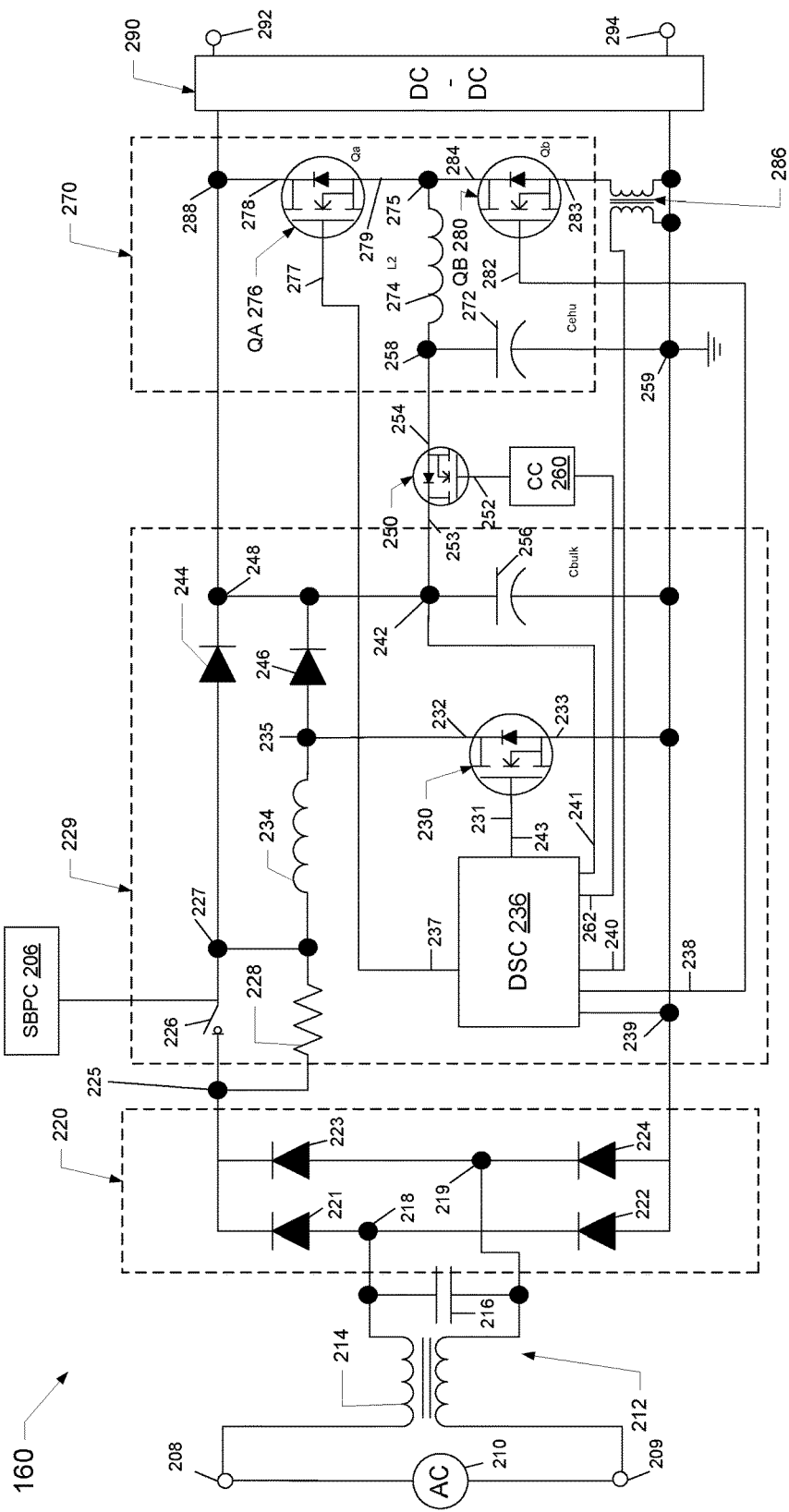
FIG. 2 is a schematic diagram of an example power supply including a hold-up time extension circuit, in accordance with one embodiment.

With reference now to FIG. 2, there is illustrated one embodiment of PSU 160. PSU 160 includes alternating current-direct current (AC-DC) rectifier circuit 220, power factor correction (PFC) circuit 229, electronic switch 250, control circuit 260, hold-up time extension circuit and reduced re-rush current circuit 270 and DC to DC converter 290. The various circuit components of PSU 160 are coupled or connected together at different circuit connection locations called "nodes", as will be described.

An external AC power source 210, such as a utility power source, is coupled to PSU 160 via input terminals 208 and 209. Electromagnetic interference (EMI) filter 212 is coupled across the input terminals 208 and 209. EMI filter 212 includes inductors 214 and capacitor 216. The input terminals or nodes 218 and 219 of AC-DC rectifier circuit 220 are coupled across capacitor 216. AC-DC rectifier circuit 220 is a full bridge rectifier circuit and includes diodes 221, 222, 223 and 224. The anode of diode 221 and the cathode of diode 222 are coupled to input node 218. The anode of diode 223 and the cathode of diode 224 are coupled to input node 219. The cathodes of diodes 221 and 223 are coupled to each other at node 225. The anodes of diodes 222 and 224 are coupled to each other at node 239. The DC output of AC-DC rectifier circuit 220 is coupled to the input of PFC circuit 229 via nodes 225 and 239.

PFC circuit 229 includes relay 226, connected between nodes 225 and 227, and an inrush current limit device (positive thermal coefficient resistor, negative thermal coefficient resistor or cement resistor) 228, connected across relay 226. In one embodiment, relay 226 can be connected to and controlled by standby power controller (SBPC) 206 and/or can be connected to a digital signal controller (DSC) 236. An inductor 234 is coupled between nodes 227 and 235.

The anode of diode 244 is connected to node 227 and the cathode is connected to node 248. The anode of diode 246 is connected to node 235 and the cathode is connected to node 248.

PFC circuit 229 further includes an electronic switch, such as a metal oxide field effect transistor (MOSFET) 230, that has a gate 231, a source 233 and a drain 232. The source 233 is coupled to a ground node 259 and the drain 232 is coupled to node 235. A digital signal controller (DSC) 236 has a terminal 243 coupled to gate 231. DSC 236 can control the operation of MOSFET 230. DSC 236 further has a terminal 237 coupled to the gate 277 of MOSFET 276, terminal 238 coupled to the gate 282 of MOSFET 280, terminal 239 coupled to ground node 259, terminal 240 coupled to a winding of current sensing transformer 286. In another embodiment, the winding can be replaced by a sensing resistor (not shown). DSC 236 further has terminal 241 coupled to node 242 and terminal 262 coupled to control circuit 260. A bulk capacitor 256 is coupled between node 242 and ground node 259. Another electronic switch, such as MOSFET 250, has a gate 252, a source 254 and a drain 253. The source 254 is coupled to node 258, and the drain 253 is coupled to node 242. Control circuit 260 is coupled to gate 252. Control circuit 260 can control the operation of MOSFET 250.

Extended hold-up (EHU) circuit 270 includes MOSFETs 276 and 280, extended hold-up capacitor 272 and inductor 274. Extended hold-up capacitor 272 is coupled between nodes 258 and 259, and inductor 274 is coupled between nodes 258 and 275. MOSFET 276 has a gate 277, a source 279 and a drain 278. The source 279 is coupled to node 275, and the drain 278 is coupled to node 288. Terminal 237 of DSC 236 is coupled to gate 277. DSC 236 can control the operation of MOSFET 276. MOSFET 280 has a gate 282, a source 283 and a drain 284. The source 283 is coupled to a winding of current sensing transformer 286, and the drain 284 is coupled to node 275. Terminal 238 of DSC 236 is coupled to gate 282. DSC 236 can control the operation of MOSFET 280. DC-DC converter 290 is coupled to nodes 259 and 288. The DC-DC converter 290 has output terminals 292 and 294.

When MOSFET 250 is turned on by control circuit 260, extended hold-up capacitor 272 and bulk capacitor 256 are connected in parallel. In one embodiment, EHU circuit 270 can function in a bi-directional manner. DSC 236 can control the operation of MOSFETS 276 and 280. EHU circuit 270 can function in a constant current mode as a buck converter to charge extended hold-up capacitor 272 and can function in a constant voltage mode as a boost converter to release energy from extended hold-up capacitor 272 to bulk capacitor 256. EHU circuit 270 can extend the hold-up time of PSU 160 and can reduce re-rush current when input power resumes after being lost.

Figure 3:
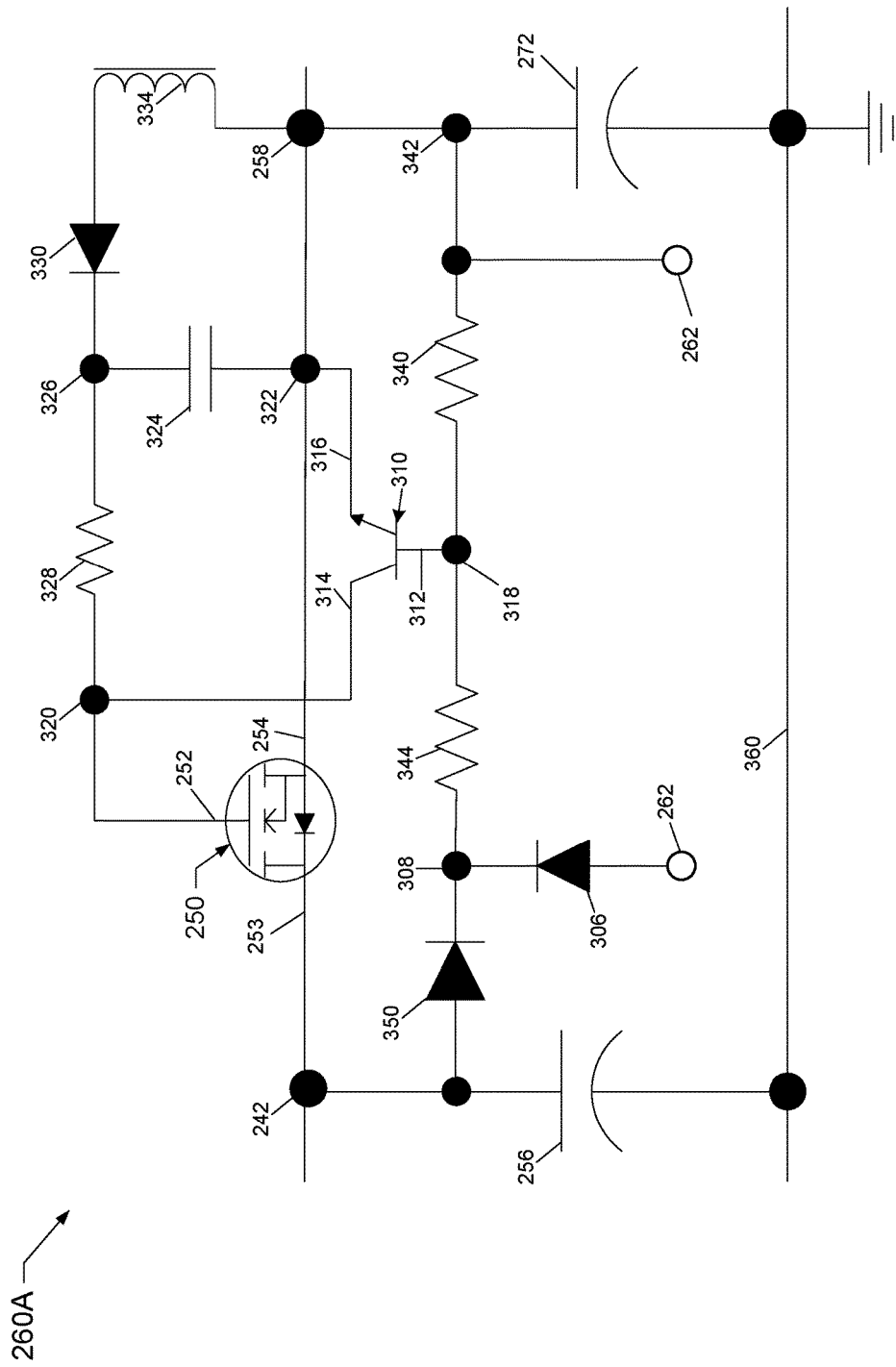
FIG. 3 is a schematic diagram of one example of a control circuit for the hold-up time extension circuit, in accordance with one embodiment.

FIG. 3 illustrates details of one embodiment of control circuit 260, (i.e., 260A). Control circuit 260A is configured for use when MOSFET 250 is a N-type MOSFET. Control circuit 260A controls the operation of MOSFET 250, allowing an extended hold-up time for PSU 160. Control circuit 260A includes a transistor 310 having a base 312, a collector 314, and an emitter 316. The base 312 is coupled to node 318. The collector 314 is coupled to node 320, and the emitter 316 is coupled to node 322. The gate 252 of MOSFET 250 is coupled to node 320 and the source 254 is coupled to node 322. A resistor 328 is coupled between nodes 320 and 326 and a capacitor 324 is coupled between nodes 322 and 326. Diode 330 has a cathode coupled to node 326 and an anode coupled to one end of winding 334. The other end of winding 334 is coupled to node 258. In one embodiment, winding 334 can be coupled with one of power factor circuit inductor 234, a standby transformer, or a main transformer. Winding 334 can provide a voltage of about 10 volts. The series combination of diode 350 and resistor 344 is coupled between nodes 242 and 318. Diode 350, resistor 344 and the cathode terminal of diode 306 are coupled to node 308. The anode terminal of diode 306 and node 342 are coupled to terminal 262 of DSC 236 (FIG. 2). A resistor 340 is coupled between nodes 318 and 342.

When AC input power is re-connected after the extended hold up time capacitor energy 272 has been depleted, the bulk capacitor 256 and extended hold up time capacitor have a large voltage difference which will induce a large circular current when MOSFET 250 turns on. Meanwhile, the input voltage will charge the bulk capacitor 256 and the extended hold up time capacitor energy 272 through MOSFET 250 inducing a higher re-rush current. Control circuit 260A functions to eliminate the unexpected large current. When bulk capacitor 256 and extended hold up time capacitor voltage difference result in a voltage across resistor 340 that is greater than 0.7 V, transistor 310 turns on. The gate to source voltage which comes from winding 334 is bypassed, and then MOSFET 250 will turn off. The resistor ratio of resistor 344 and resistor 340 will decide the allowable maximum circular current. Once the extended hold up time capacitor 272 voltage is charged, via EHU circuit 270 in a constant current buck mode, to approach the voltage of bulk capacitor 256, transistor 310 will turn off. Next, the gate to source voltage of MOSFET 250 increased until MOSFET 250 turns on. Therefore, the bulk capacitor 256 and extended holdup time capacitor 272 are operating in parallel under normal operating conditions. MOSFET 250 is also controlled by DSC 236. When AC input is disconnected, the bulk capacitor 256 and extended hold up time capacitor 272 support the energy simultaneously until DSC 236 detects their voltage decay to a designated voltage (for example, 340V). DSC 236 then sends a high signal to keep high a signal state until the AC input power 210 is re-connected, via off-the-shelf high side driver to turn transistor 310 on. MOSFET 250 is then turned off and the bulk capacitor 256 keeps releasing energy and the extended hold up time capacitor 272 transitions to a boost mode for charging the bulk capacitor 256.

Figure 4:
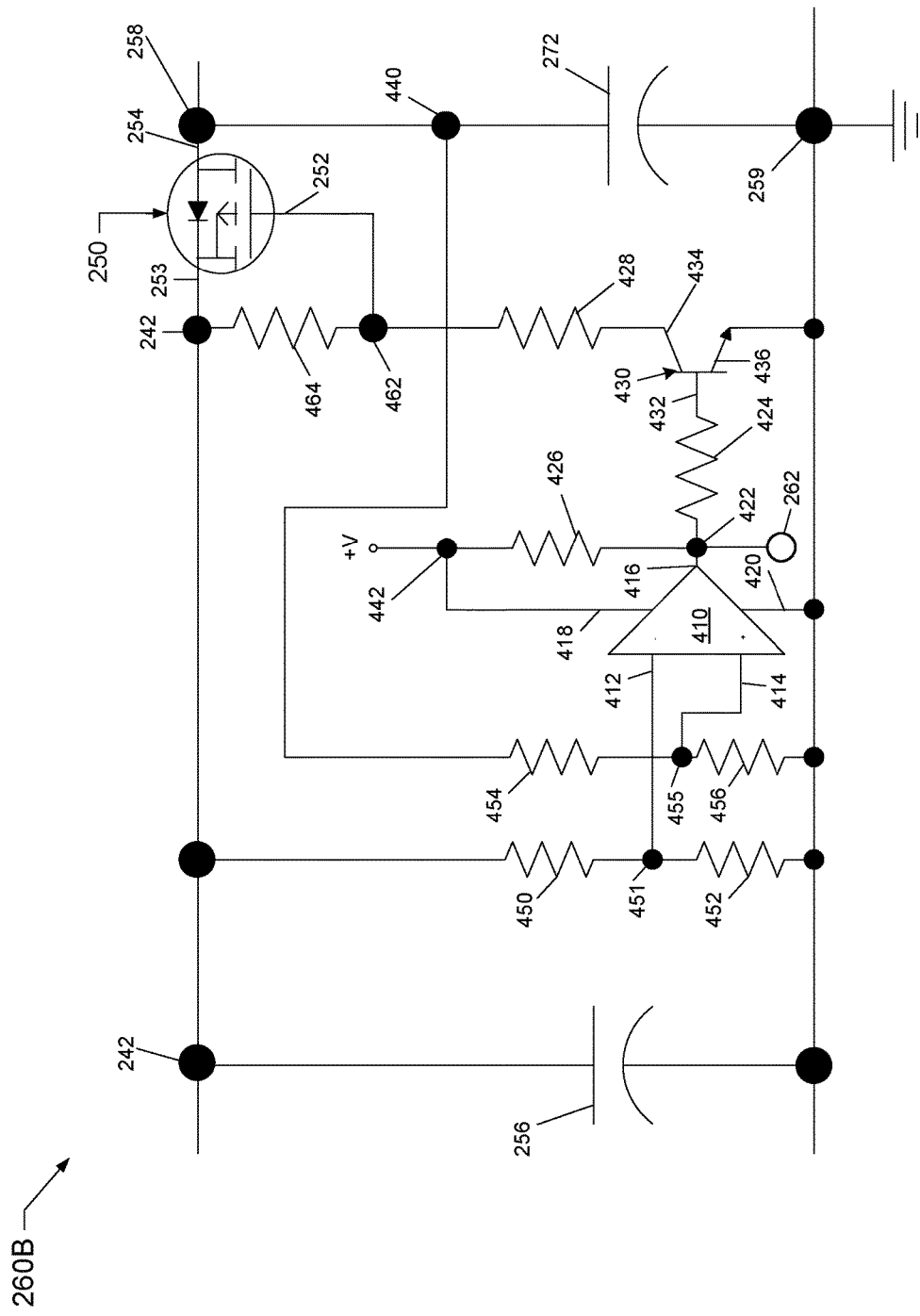
FIG. 4 is a schematic diagram of another example of a control circuit for the hold-up time extension circuit, in accordance with one embodiment.

FIG. 4 illustrates details of another embodiment of control circuit 260, (i.e., 260B). Control circuit 260B is configured for use when MOSFET 250 is a P-type MOSFET. Control circuit 260B controls the operation of MOSFET 250, allowing an extended hold-up time for PSU 160. Control circuit 260B includes an operational amplifier (OA) 410 that has negative input terminal 412, positive input terminal 414, output terminal 416, power terminal 418 and ground terminal 420. OA 410 and associated feedback components are specific to this implementation, but alternative methods can be used, in alternate embodiments, to achieve similar functionality. Power terminal 418 is coupled to node 442, which is coupled to a voltage source. Resistor 426 is coupled between node 442 and node 422, which is coupled to output terminal 416. Ground terminal 420 is coupled to ground. Negative input terminal 412 is coupled to node 451. Positive input terminal 414 is coupled to node 455. Resistor 450 is coupled between node 451 and node 242. Resistor 452 is coupled between node 451 and ground node 259. The series combination of resistor 450 and 452 are coupled across bulk capacitor 256. Resistor 454 is coupled between node 455 and node 440. Resistor 456 is coupled between node 455 and ground node 259.

Control circuit 260B further includes transistor 430, having a base 432, a collector 434 and an emitter 436. The base 432 is coupled to one end of resistor 424 and the other end is coupled to node 422, which is coupled to output terminal 416 and terminal 262 of DSC 236. The collector 434 is coupled to one end of resistor 428, and the emitter 436 is coupled to ground node 259. The other end of resistor 428 is coupled to node 462. Resistor 464 is coupled between node 462 and node 242. Extended hold-up time capacitor 272 is coupled between node 440 and ground node 259. The gate 252 of MOSFET 250 is coupled to node 462. The drain 253 is coupled to node 242, and the source 254 is coupled to node 258.

During normal operation, MOSFET 250 is on and both bulk capacitor 256 and extended hold up time capacitor 272 are in parallel. When AC input power is lost, both capacitors release energy and once their voltage decays to a designated voltage (e.g. 340V), DSC 236 sends a low or ground signal (its normal state is open and it will return to normal state until AC is re-connected) to turn off transistor 430 such that MOSFET 250 is also turned off. When AC power input is re-connected, the bulk capacitor 256 is charged by PFC circuit 229 and the extended hold up capacitor 272 is charged by EHU circuit 270 which converts energy from bulk capacitor 256 to extended hold up capacitor 272. The energy of the bulk capacitor is fully charged , for example to 400V, earlier than for the extended hold up time capacitor 272, since the PFC circuit 229 provides much higher charge energy. In the control circuit 260B, the node 451 voltage is given by the divider of resistor 450 and resistor 452. After the extended hold up time capacitor 272 is charged to a designated voltage and the voltage at node 455 is greater than the voltage at node 451, OPA 410 pulls the voltage to a high level from the original level of about 0V such that transistor 430 turns on. After transistor 430 turns on, resistor 464 has about −10V across the gate to source pin of MOSFET 250, such that MOSFET 250 turns on. In the previous state, MOSFET 250 is off because the voltage at node 455 is lower than the voltage at node 451 resulting in transistor 430 being off and the voltage across MOSFET 250 gate to source pin is 0V.

Figure 5:
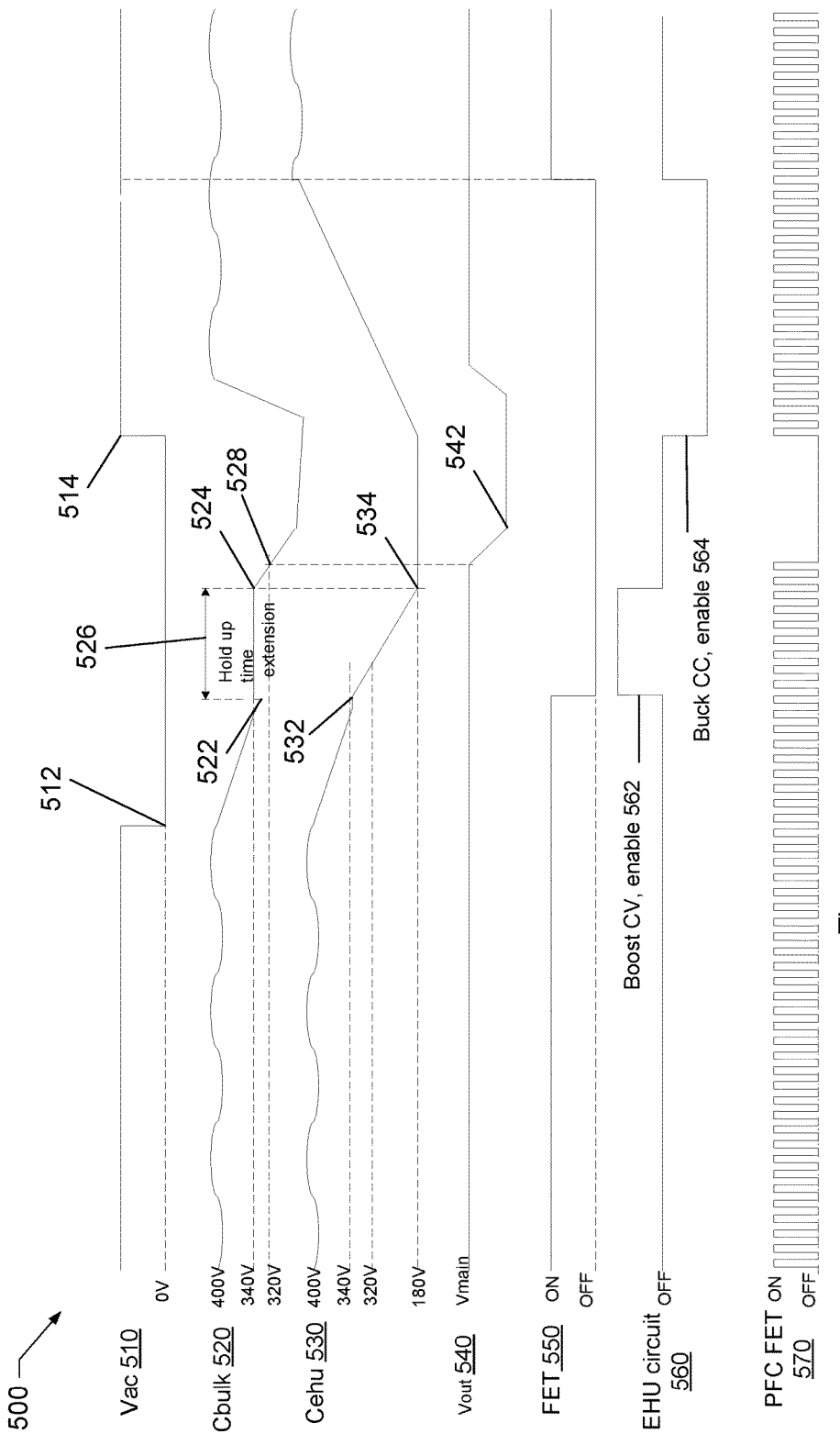
FIG. 5 is a graph of voltage versus time for several different nodes of the power supply of FIG. 2, in accordance with one embodiment.

FIG. 5 illustrates a series of waveforms, plotting voltages over time for several different components of PSU 160. Associating the waveforms with the components of FIGS. 1-4, voltage Vac 510 is the voltage at AC power source 210. Cbulk 520 is the voltage across bulk capacitor 256. Cehu 530 is the voltage across extended hold-up capacitor 272. Vout 540 is the voltage at output terminals 292 and 294. FET 550 indicates if MOSFET 250 is on or off. EHU circuit 560 indicates when EHU circuit 270 is on or off. PFC FET 570 indicates when the PFC MOSFET 230 is switching on and off.

Referring to FIGS. 1-5, the operation PSU 160 having an extended hold-up time will now be described. Rectifier circuit 220 supplies a rectified DC voltage to PFC circuit 229. PFC circuit 229 operates to improve the power factor and reduce harmonic distortion. Electronic switch 250, control circuit 260, and hold-up time extension circuit 270 function to extend the hold-up time of PSU 160 when input power is lost and to minimize an in-rush or re-rush current when the PSU 160 is re-connected with the input power after power is lost. In one embodiment, PSU 160 can extend hold-up time to 30 milliseconds per design after input power is lost.

Bulk capacitor 256 and extended hold-up capacitor 272 are in parallel configuration such that, during normal operation, the overall capacitor impedance or equivalent series resistance (ESR) is lower and any power losses are lower. The lower ESR slightly improves the efficiency of PSU 160. When AC input power 210 is lost, (at voltage 512 of FIG. 5), bulk capacitor 256 and extended hold-up capacitor 272 are still connected in parallel to provide energy to DC-DC converter 290. As the voltage across bulk capacitor 256 and extended hold-up capacitor 272 (i.e., voltage 522 of Cbulk voltage 520, voltage 532 of Cehu voltage 530) decays to about 340 volts, MOSFET 250 will turn off and the extended hold-up capacitor 272 will continue to release energy to the bulk capacitor 256 via the EHU circuit 270 to maintain the voltage of bulk capacitor 256 at 340 volts (voltage 524). As shown in FIG. 5, when EHU circuit 270 transitions from a stop mode to a boost mode, the extended hold up capacitor voltage will stay flat. The hold-up time extension 526 is also shown and it is provided by extended hold up capacitor 272.

When the voltage of extended hold-up capacitor 272 decays to a specified voltage (voltage 534) (e.g., 180 volts), EHU circuit 270 will turn off. However, the bulk capacitor 256 will continue to deliver energy to the DC-DC converter 290. When the Cbulk voltage 520 falls to 320 volts (voltage 528), the PFC circuit 229 turns off and Vout 540 starts to decay toward zero (voltage 542) depending upon the DC/DC converter 290 design. In one embodiment, the Cbulk voltage 520 can include a margin (e.g., 20V) to avoid ripple in the voltage. The voltage ripple can trigger the 320 volt stop voltage by mistake. With regard to the hold-up time extension and re-rush current reduction, based on the capacitor energy formula given by $\frac{1}{2} \times C \times (Vmax-Vmin)^2 \times f$, there are some ways to extend hold up time, such as increasing capacitance, which increases the PSU size so it is not a good idea in a high density design. Another way to increase hold-up time is to reduce the bulk capacitor minimum voltage Vmin, which results in a high re-rush current. For example if Vmin is set from original 320V to 180V, the re-rush current based on formula (Vin,peak−Vbulk_min)÷(Rinput)=(370V−180V)÷0.3Ω≈600A. In this equation, Rinput represents the total resistance of EMI, PFC stage and PCB track and it is dependent on application. A high power density PSU may have lower resistance. The large re-rush current may damage some of input loop devices, such as the fuse, bridge diode and PFC bypass diode etc. In one embodiment, the extended hold up time capacitor 272 minimum working voltage can be set to 180V, but its re-rush current is limited to (Vin,peak−Vbulk_min)÷(Rinput)= (370V−320V)÷0.3Ω≈160 A. Since the bulk capacitor 256 and extended hold up time capacitor 258 are isolated by MOSFET 250 and EHU circuit 270, a further reduction on re-rush current is to set the bulk capacitor 256 minimum working voltage higher and the hold-up time energy is dependent on the extended hold up time capacitor 272.

When the line voltage Vac 510 resumes at voltage 514, the relay 226 is kept on by the SBPC 206 and/or DSC 236 if the Cbulk voltage is greater than 320 volts. If the Cbulk voltage is less than 320 volts, relay 226 is turned off. In the condition where Cbulk is decaying to 320V when the AC line voltage 210 is re-connected at peak voltage 264 Vrms, a re-rush current will flow through the EMI inductor 214, relay 226, and diodes 244 to charge bulk capacitor 256. EHU circuit 270 provides constant current charging for extended hold up time capacitor 272 and isolates the bulk capacitor 256, such that in-rush or re-rush current is only determined by the bulk capacitor 256. MOSFET 250 and EHU circuit 270 provide for lower in-rush or re-rush current in PSU 160. The extended hold up capacitor 272 is isolated by EHU circuit 270 and is charged by a constant current mode path. When the Cehu voltage 530 across extended hold up capacitor 272 approaches Cbulk voltage 520, control circuit 260 will turn on MOSFET 250 for better efficiency. The timing to turn on MOSFET 250 can be determined by a forward current or a voltage difference between Cbulk 256 and CEHU 272.

EHU circuit 270 functions in two different modes. EHU circuit 270 functions in a constant current mode 564 when the circuit is charging extended hold-up capacitor 272 and functions in a constant voltage mode 562 when the circuit is releasing energy from extended hold-up capacitor 272. In the constant voltage mode, EHU circuit 270 causes PSU 160 to function as a boost converter (562) to regulate Cbulk at 340 volts. In the constant current mode, EHU circuit 270 causes PSU 160 to function as a buck converter (564) to limit the charging current. In one embodiment, EHU circuit 270 allows PSU 160 to function as a buck converter in a constant current mode whose output voltage (Cehu 530) is as high as the input voltage.

Figure 6:
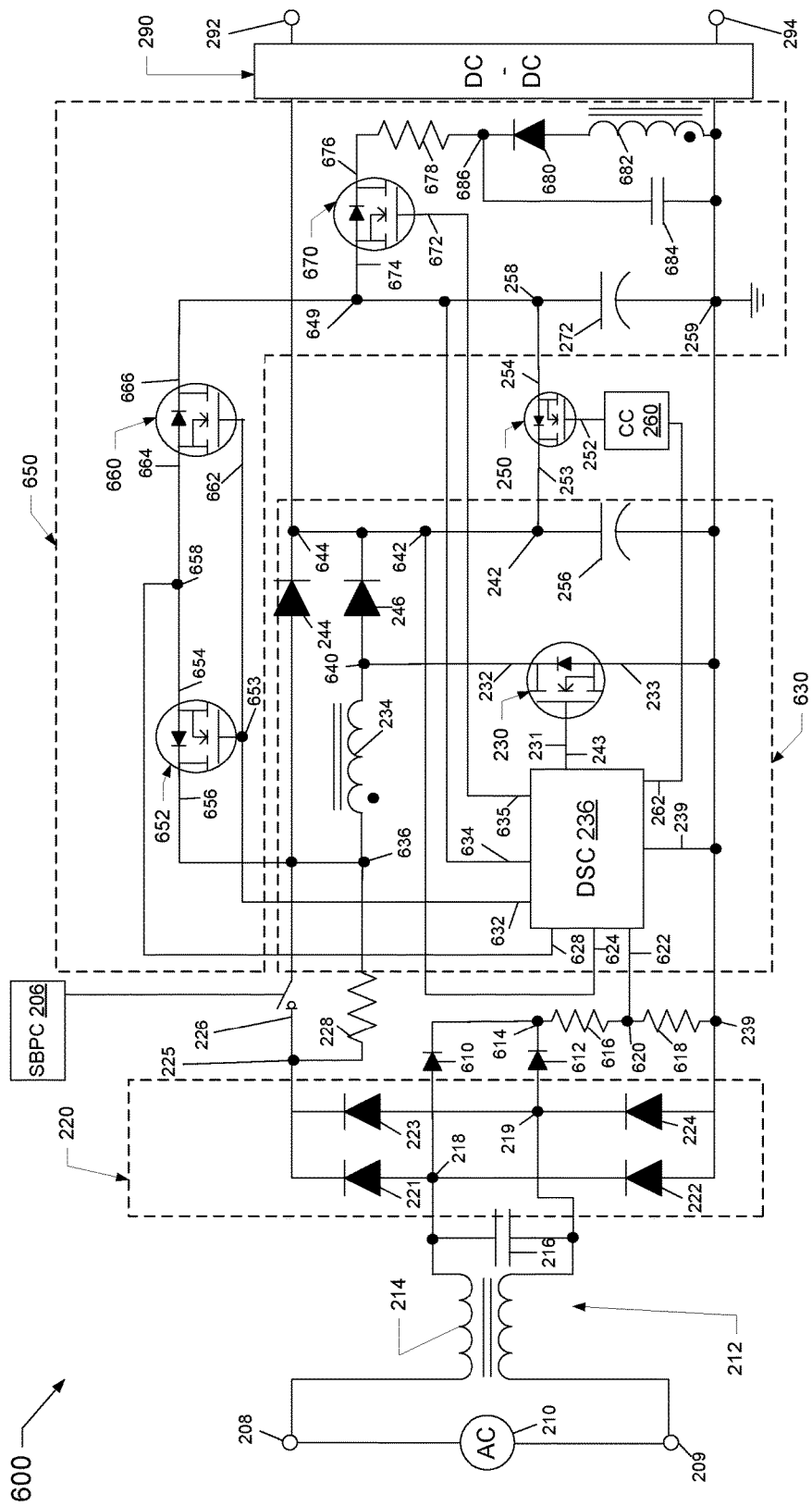
FIG. 6 is a schematic diagram of another example power supply that includes a hold-up time extension circuit, in accordance with one embodiment.

With reference now to FIG. 6, there is illustrated another embodiment of a PSU, PSU 600, that enables an extended hold-up time. PSU 600 includes AC-DC rectifier circuit 220, power factor correction (PFC) circuit 630, electronic switch 250, control circuit 260, hold-up time extension circuit and reduced re-rush current circuit 650, and DC to DC converter 290.

An external AC power source 210, such as a utility power source, is coupled to PSU 600 via input terminals 208 and 209. Electromagnetic interference (EMI) filter 212 is coupled across input terminals 208 and 209. EMI filter 212 includes inductors 214 and capacitor 216. Input terminals or nodes 218 and 219 of AC-DC rectifier circuit 220 are coupled across capacitor 216. AC-DC rectifier circuit 220 is a full bridge rectifier circuit and includes diodes 221, 222, 223 and 224. The anode of diode 221 and the cathode of diode 222 are coupled to node 218. The anode of diode 223 and the cathode of diode 224 are coupled to node 219. The cathodes of diodes 221 and 223 are coupled to node 225. The anodes of diodes 222 and 224 are coupled to node 239. The DC output of AC-DC rectifier circuit 220 is coupled to the input of PFC circuit 630 via nodes 225 and 239.

The anode of diode 610 is coupled to node 218, and the cathode is coupled to node 614. The anode of diode 612 is coupled to node 219, and the cathode is coupled to node 614. Resistor 616 is coupled between node 614 and node 620. Resistor 618 is coupled between node 620 and node 239. A relay 226 is connected between nodes 225 and 636, and an inrush current limit device (positive thermal coefficient resistor, negative thermal coefficient resistor and cement resistor) 228 is connected across the relay. In one embodiment, relay 226 can be connected to and controlled by a standby power controller (SBPC) 206 and/or DSC 236.

PFC circuit 630 includes inductor 234 that is coupled between nodes 636 and 640. The anode of diode 246 is connected to node 640 and the cathode is connected to node 642. The anode of diode 244 is connected to node 636 and the cathode is connected to node 642. PFC circuit 630 further includes an electronic switch, such as a metal oxide field effect transistor (MOSFET) 230, that has a gate 231, a source 233 and a drain 232. The source 233 is coupled to a ground node 259 and the drain 232 is coupled to node 640. Digital signal controller (DSC) 236 has a terminal 243 coupled to gate 231. DSC 236 can control the operation of MOSFET 230. DSC 236 further has a terminal 622 coupled to node 620, terminal 624 coupled to node 642, terminal 628 coupled to node 658, terminal 632 coupled to the gates 653 and 662 of MOSFETs 652 and 660, terminal 634 coupled to node 649, terminal 635 coupled to the gate 672 of MOSFET 670, and terminal 631 is coupled to ground node 259. Terminal 262 of DSC 236 is coupled to control circuit 260. A bulk capacitor 256 is coupled between node 242 and ground node 259. Another electronic switch, such as MOSFET 250, has a gate 252, a source 254 and a drain 253. The source 254 is coupled to node 258 and the drain 253 is coupled to node 242. A control circuit 260 is coupled to gate 252. Control circuit 260 can control the operation of MOSFET 250.

EHU circuit 650 includes MOSFETs 652, 660 and 670, extended hold-up capacitor 272, resistor 678, diode 680, a winding 682, and capacitor 684, which is optional. In one embodiment, winding 682 can be coupled with one of power factor circuit inductor 234, a standby transformer, or a main transformer. Extended hold-up capacitor 272 is coupled between nodes 258 and 259. One end of winding 682 is coupled to ground node 239 and the other end is coupled to the anode of diode 680. The cathode of diode 680 is coupled to node 686. Capacitor 684 is coupled between node 686 and ground node 239. Resistor 678 is coupled between node 686 and drain 676.

MOSFET 652 has a gate 653, a source 654 and a drain 656. The source 654 is coupled to node 658 and the drain 656 is coupled to node 636. Terminal 632 of DSC 236 is coupled to gate 653. DSC 236 can control the operation of MOSFET 652 via an off-the-shelf high side driver which is combined in DSC 236. MOSFET 660 has a gate 662, a source 664 and a drain 666. The source 664 is coupled to node 658 and the drain 666 is coupled to node 649. Terminal 632 of DSC 236 is coupled to gate 662. DSC 236 can control the operation of MOSFET 660 via an off-the-shelf high side driver which is combined in DSC 236. MOSFET 670 has a gate 672, a source 674 and a drain 676. The source 674 is coupled to node 649 and the drain 676 is coupled to resistor 678. Terminal 635 of DSC 236 is coupled to gate 672. DSC 236 can control the operation of MOSFET 670 via an off-the-shelf high side driver which is combined in DSC 236. DC-DC converter 290 is coupled to nodes 644 and 259. The DC-DC converter 290 has output terminals 292 and 294.

During normal operation, PSU 600 functions substantially similar to PSU 160. When MOSFET 250 is turned on by control circuit 260, extended hold-up capacitor 272 and bulk capacitor 256 are connected in parallel. DSC 236 can control the operation of MOSFETS 652, 660 and 670. When AC input power is disconnected, both of the capacitors (extended hold-up capacitor 272 and bulk capacitor 256) provide energy to downstream DC-DC converter 290. After their voltage decays to a designated voltage (e.g., 340V), MOSFET 250 is turned off by DSC 236 via an off-the-shelf high side driver and bulk capacitor 256 continues releasing energy to DC-DC 290. Meanwhile, MOSFET 660 and MOSFET 652 are turned on simultaneously so extended hold up time capacitor 272 has a discharge path through PFC network 630 such that bulk capacitor 256 regulates the voltage at a designated voltage (e.g., 340V). Once the extended the hold-up time capacitor 272 discharges to a specified voltage (e.g., 180V), MOSFET 652 and MOSFET 660 are turned off and the bulk capacitor 256 voltage is no longer maintained and continues decay to 320V. This voltage is the minimum voltage for the downstream DC-DC converter 290. The DC-DC converter's output starts to decay and then relay 226 is turned off. Later, SBPC 206 turns off while the bulk capacitor 256 voltage is decaying to the SBPC 206 minimum working voltage. The PSU then waits for the AC input power to be re-connected for booting up. When the AC input power is re-connected, an inrush current flows through EMI 214, bridge diode 220, inrush current limit device 228 and PFC bypass diode 244 to charge bulk capacitor 256. After the voltage of bulk capacitor 256 becomes greater than the SPBC 206 threshold voltage, SPBC 206 is turned on. PFC 229 and the DC-DC converter 290 are also turned on and PSU 600 operates normally. The inrush current path is only flowing through bypass diode 244. Because the path through diode 246 has a higher forward conducted voltage, MOSFET 652 is turned off since DSC 236 has not been biased during the initial startup. MOSFET 250 is turned on because the bulk capacitor voltage is increasing and there is almost no voltage difference with the voltage of the extended hold up time capacitor 258. DSC 236 does not change the state of MOSFET 250 because the AC input power is normal.

The preceding paragraph relates to the scenario/condition when AC power is lost and relay 226 is in an off condition. The following description relates to the condition when AC input power is lost and relay 226 is still in an on state. When input power is reconnected after being lost for a while and the bulk capacitor 256 voltage is at, e.g., 340V and the extended hold up capacitor 272 voltage decays to 180V to support the bulk capacitor 256 energy via MOSFET 651 and 660, MOSFET 250 and MOSFET 670 are off. When AC input power is re-connected at the peak voltage, (e.g., 264 Vac), and relay 226 is still on, the re-rush current will be large. A first re-rush current flows through EMI 214, bridge diode 220, MOSFET 652, and MOSFET 660 to extended hold up time capacitor 272 (which is at, e.g., 180V). A second re-rush current path flows through EMI 214, bridge diode 220, diode 244 to bulk capacitor 256 (which is at, e.g., 340V). The second re-rush current is minor. In order to reduce re-rush current, MOSFET 652 will turn off when DSC 236 senses that the input is re-connected and the voltage sensed by DSC 236 is high. The voltage sensing components include diode 610, diode 614, resistor 616 and resistor 618. The voltage sensing components sense the instantaneous input voltage at a location prior to the bridge diode. In one embodiment, the sensing location can be moved prior to EMI choke 214, which is dependent on input voltage working range and design. For example, in a universal input range of 90VAC~264 VAC, it is preferable to sense at location prior to the EMI stage, and in a single range input design such as a 115V or 230V power system, the voltage sensing can be at a location prior to the bridge diode. DSC 236 senses the instantaneous input voltage with a fixed frequency (e.g., 200 k or faster) to decide when to turn off MOSFET 652 when the instantaneous voltage reaches a designated voltage (e.g., ~100V). The voltage detection is only enabled in the period of time that MOSFET 652 is on. If the sampling rate of DSC 236 is not fast enough, MOS- FET 652 can be turned off first when terminal 622 has a voltage greater than 0V. Because MOSFET 652 is off, the re-rush current is dominated by the path through EMI 214, bridge diode 220, diode 244 to bulk capacitor 256, which limits the re-rush current to less than 160 A. This limited re-rush current is much less than the original path of about 600 A. A further reduction of re-rush current is provided by setting bulk capacitor 256 minimum voltage to a higher voltage, e.g., 370 volts, such that the re-rush current for bulk capacitor 256 becomes substantially zero. After the input voltage resumes, MOSFET 652 is off and MOSFET 250 is also off. The bulk capacitor 256 (e.g. 340V) has a much higher voltage than the voltage on extended hold up time capacitor 272 (e.g. 180V). These two capacitors are charged by PFC circuit 630 and extended hold up time capacitor charger, which are composed of winding 682, diode 680, capacitor 684, resistor 676 and MOSFET 670. MOSFET 670 is turned on when MOSFET 652 and MOSFET 250 are off. Bulk capacitor 256 is fully charged much faster than extended hold up time capacitor 272 is charged/ because the charging current of capacitor 272 is limited by resistor 678. Once the extended hold up time capacitor 272 voltage approaches the voltage of bulk capacitor 256, MOSFET 250 will turn on and MOSFET 670 will turn off simultaneously.

In addition, PSU 600 has several advantages. These advantages include: (1) PSU 600 can provide a substantially zero re-rush current to prevent input loop devices from being damaged when AC input power resumes; (2) PSU 600 can prevent the saturation of PFC inductor 234 when the AC input voltage resumes; and (3) PSU 600 can reduce circular currents in extended hold-up capacitor 272 and bulk capacitor 256 when they are connected by MOSFET 250.

With respect to the first advantage, re-rush current occurs when the AC input returns, and the AC voltage starts to charge bulk capacitor 256 via relay 226. Because relay 226 is on, the re-rush current is much greater than the initial inrush current. In one embodiment, when AC input power is lost, SBPC 206 and/or DSC 236 will turn off relay 226 if the voltage on bulk capacitor 256 falls to 370 volts, thereby limiting the re-rush current. When AC input power resumes, MOSFET 652 can be used to block charging of extended hold-up capacitor 272, further limiting re-rush current. In addition, the minimum working voltage of bulk capacitor 256 can be set higher than the peak input voltage. The overall result is that re-rush currents through inductor 234, diode 244 (which is optional and is needed when bulk capacitor minimum working voltage is set to less than 370 volts) and MOSFETS 652 and 660 are substantially zero.

With respect to the second advantage, PSU 600 can prevent the saturation of inductor 234 when the AC input voltage resumes. Relay 226 is on when the voltage of bulk capacitor 256 is higher than 370 volts, otherwise the relay is off. Since the AC input voltage is lower than 370 volts and there are voltage losses from the rectifier diodes and diodes 244, 246, the resulting re-rush current is less than what is necessary to saturate inductor 234.

In regards to the third advantage, PSU 600 can reduce circular currents in extended hold-up capacitor 272 and bulk capacitor 256 when the capacitors (272, 252) are connected by MOSFET 250. After the energy in extended hold-up capacitor 272 is exhausted and assuming MOSFET 250 was to turn on, a circular current would occur between extended hold-up capacitor 272 and bulk capacitor 256. The winding 682 provides a pre-charging energy to reduce the circular current between extended hold-up capacitor 272 and bulk capacitor 256 when MOSFET 250 is turned on. In one embodiment, winding 682 can be coupled with one of PFC circuit inductor 234, a standby transformer, or a main transformer.

Figure 7:
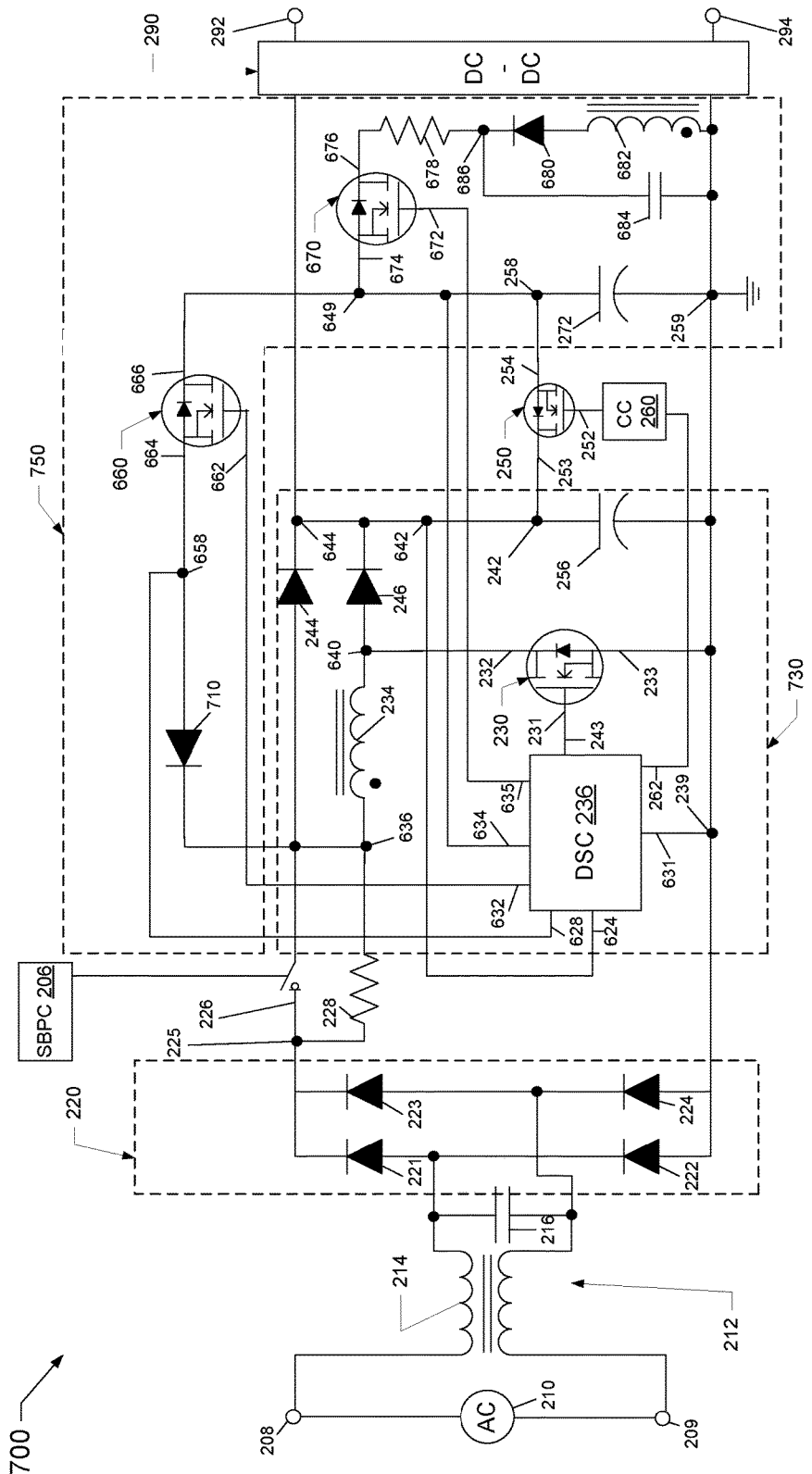
FIG. 7 is a schematic diagram of an additional example power supply that includes a hold-up time extension circuit, in accordance with one embodiment.

FIG. 7 illustrates an additional embodiment of a PSU, PSU 700, that enables an extended hold-up time. PSU 700 includes AC-DC rectifier circuit 220, power factor correction (PFC) circuit 730, electronic switch 250, control circuit 260, hold-up time extension and reduced re-rush current circuit 750 and DC to DC converter 290.

An external AC power source 210, such as a utility power source, is coupled to PSU 600 via input terminals 208 and 209. An electromagnetic interference (EMI) filter 212 is coupled across input terminals 208 and 209. EMI filter 212 includes inductors 214 and capacitor 216. The input terminals or nodes 218 and 219 of AC-DC rectifier circuit 220 are coupled across capacitor 216. AC-DC rectifier circuit 220 is a full bridge rectifier circuit and includes diodes 221, 222, 223 and 224. The anode of diode 221 and the cathode of diode 222 are coupled to node 218. The anode of diode 223 and the cathode of diode 224 are coupled to node 219. The cathodes of diodes 221 and 223 are coupled to node 225. The anodes of diodes 222 and 224 are coupled to ground node 239. The DC output of AC-DC rectifier circuit 220 is coupled to the input of the PFC circuit 230 via nodes 225 and 239.

A relay 226 is connected between nodes 225 and 636 and an inrush current limit device (positive or negative thermal coefficient resistor or cement resistor) 228 is connected across the relay. In one embodiment, relay 226 can be connected to and controlled by standby power controller (SBPC) 206 and/or DSC 236.

PFC circuit 730 includes inductor 234, which is coupled between nodes 636 and 640. The anode of diode 246 is connected to node 640 and the cathode is connected to node 642. The anode of diode 244 is connected to node 636 and the cathode is connected to node 644. PFC circuit 730 further includes an electronic switch, such as a metal oxide field effect transistor (MOSFET) 230, that has a gate 231, a source 233, and a drain 232. The source 233 is coupled to ground node 259 and the drain 232 is coupled to node 640. A digital signal controller (DSC) 236 has a terminal 243 coupled to gate 231. DSC 236 can control the operation of MOSFET 230. DSC 236 further has terminal 624 coupled to node 642, terminal 628 coupled to node 658, terminal 632 coupled to the gate 662 of MOSFET 660, terminal 634 coupled to nodes 258 and 649, terminal 635 coupled to the gate 672 of MOSFET 670, and terminal 631 coupled to ground node 239. Terminal 262 of DSC 236 is coupled to control circuit 260. Bulk capacitor 256 is coupled between node 242 and ground node 259. Another electronic switch, such as MOSFET 250, has a gate 252, a source 254, and a drain 253. The source 254 is coupled to node 258 and the drain 253 is coupled to node 242. A control circuit 260 is coupled to gate 252. Control circuit 260 can control the operation of MOSFET 250.

EHU circuit 750 includes MOSFETs 660 and 670, diode 710, extended hold-up capacitor 272, resistor 678, diode 680, inductor 682, and capacitor 684. Extended hold-up capacitor 272 is coupled between nodes 258 and 259. One end of inductor 682 is coupled to ground node 259 and the other end is coupled to the anode of diode 680. The cathode of diode 680 is coupled to node 686. Capacitor 684 is coupled between node 686 and ground node 259. Resistor 678 is coupled between node 686 and drain 676.

Diode 710 has an anode coupled to node 658 and a cathode coupled to node 636. MOSFET 660 has a gate 662, a source 664 and a drain 666. The source 664 is coupled to node 658 and the drain 666 is coupled to node 649. Terminal 632 of DSC 236 is coupled to gate 662. DSC 236 can control the operation of MOSFET 660. MOSFET 670 has a gate 672, a source 674, and a drain 676. The source 674 is coupled to node 649 and the drain 676 is coupled to resistor 678. Terminal 635 of DSC 236 is coupled to gate 672. DSC 236 can control the operation of MOSFET 670. DC-DC converter 290 is coupled to nodes 644 and 259. The DC-DC converter 290 has output terminals 292 and 294.

PSU 700 operates similar to PSU 600 except that the efficiency is slightly lower while extended hold up time capacitor 272 releases energy to bulk capacitor 256. In PSU 700, diode 710 replaces MOSFET 652 of PSU 600 and allows the elimination of diodes 610, 612 and resistors 616 and 618.

PSU 700 is a simplified version of PSU 600. When the performance of DSC 236 is not sufficient to turn off MOSFET 652 as fast as needed, diode 710 replaces MOSFET 652. Using diode 710, PSU 700 won't have any inrush or re-rush current flowing through it from input power, and diode 710 only conducts when AC input power is lost and extended hold up time capacitor 272 releases its energy to the bulk capacitor 256 via MOSFET 660 on, diode 710 and PFC circuit 730. MOSFET 660 is turned on when AC input power is lost and both bulk capacitor 256 and extended hold up time capacitor 272 is releasing their energy and their voltage decays to about 340 volts. At this point, MOSFET 250 is turned off and MOSFET 660 turns on. The remainder of the operation of PSU 700 is the same as the operation of PSU 600.

Figure 8:
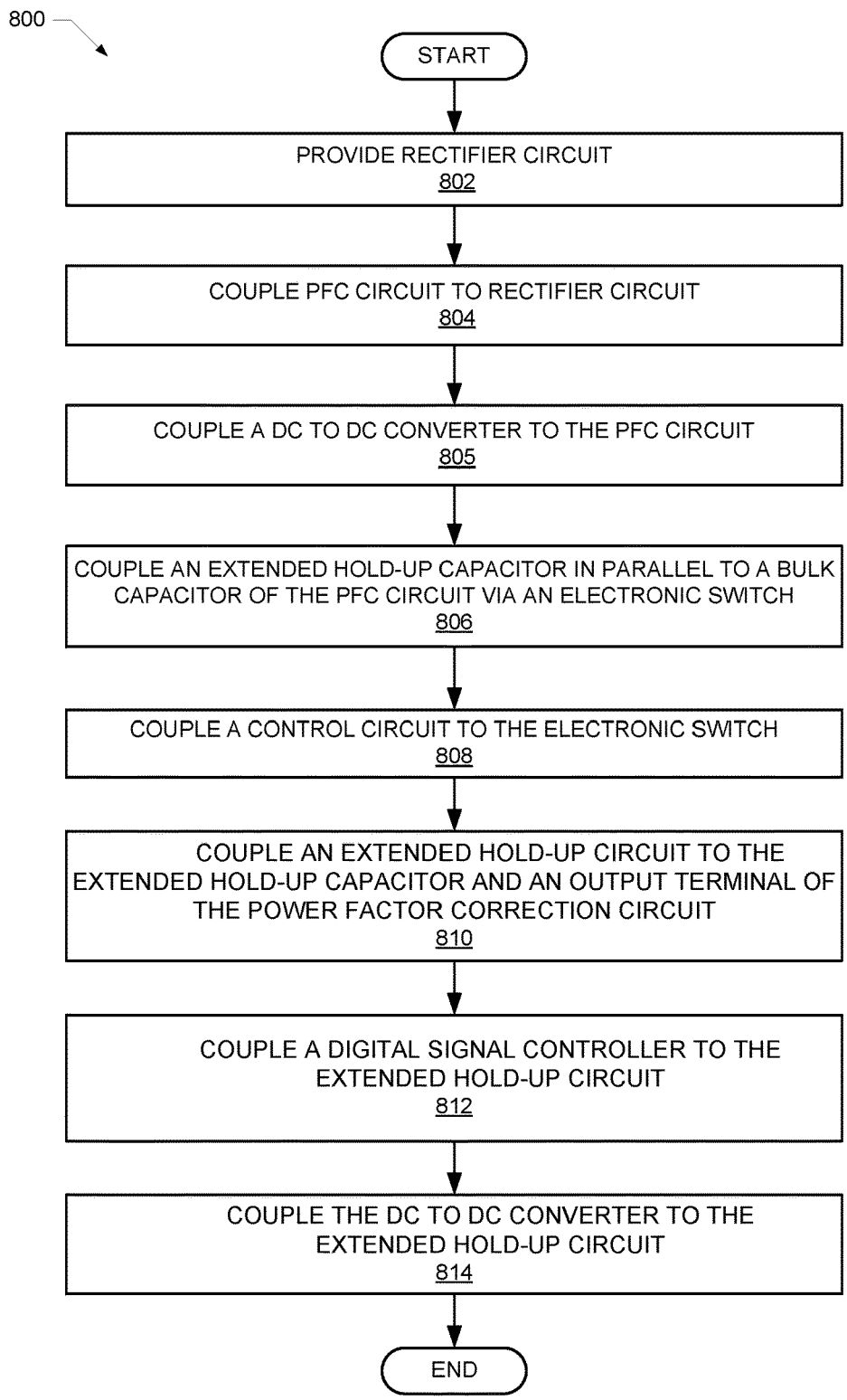
FIG. 8 is a flow chart illustrating one example of a method for manufacturing a power supply that provides extended hold-up time and reduced re-rush current, in accordance with one embodiment.

FIG. 8, illustrates a flowchart of an exemplary method for manufacturing a power supply for an electronic device. Generally, method 800 represents a method to manufacture PSU 160. The description of method 800 is provided with general reference to the specific components illustrated within the preceding FIGS. 1-8.

With specific reference to FIG. 8, method 800 begins at the start block and proceeds to block 802 where rectifier circuit 220 is provided. At block 804, PFC circuit 229 is coupled to rectifier circuit 220. PFC circuit 229 includes a bulk capacitor 256. Rectifier circuit 220 receives AC power from AC input power source 210 and supplies a rectified DC voltage to PFC circuit 229. PFC circuit 229 operates to improve the power factor and reduce harmonic distortion. DC-DC converter 290 is coupled to PFC circuit 229 (block 805). Extended hold-up capacitor 272 and bulk capacitor 256 are coupled in parallel via an electronic switch such as MOSFET 250 (block 806). Control circuit 260 is coupled to MOSFET 250 (block 808). Control circuit 260 and DSC 236 control the operation of MOSFET 250.

Extended hold-up circuit 270 is coupled to extended hold-up capacitor 272 and to an output terminal of PFC circuit 229 (block 810). DSC 236 is coupled to extended hold-up circuit 270 (block 812). DSC 236 can at least partially control the operation of extended hold-up circuit 270. DC-DC converter 290 is coupled to the extended hold-up circuit 270 (block 814). DC-DC converter 290 provides a regulated DC voltage at output terminals 292 and 294. Method 800 then ends.

In combination, DSC 236, electronic switch 250, control circuit 260, and hold-up time extension circuit 270 function to extend the hold-up time of PSU 160 when input power is lost and to minimize re-rush current when the PSU 160 is re-connected with the input power after power is lost. In one embodiment, PSU 160 can extend hold-up time to 30 milliseconds after input power is lost.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A power supply comprising:
    a rectifier circuit that receives alternating current (AC) input power;
    a power factor correction circuit coupled to an output of the rectifier circuit, the power factor correction circuit including a bulk capacitor;
    an extended hold-up capacitor coupled in parallel to the bulk capacitor, via a first electronic switch, the first electronic switch having a first terminal coupled to the bulk capacitor and a second terminal coupled to the extended hold-up capacitor, wherein the extended hold-up capacitor applied to function as a boost converter to release energy to the bulk capacitor in the event where input power is reduced or interrupted, and further functions to reduce re-rush current when AC input power is restored;
    a control circuit coupled to a third terminal of the first electronic switch, the control circuit operable to control the operation of the first electronic switch;
    an extended hold-up circuit comprising the extended hold-up capacitor and coupled to an output terminal of the power factor correction circuit; and
    a digital signal controller coupled to the extended hold-up circuit, the digital signal controller operable to control the operation of the extended hold-up circuit;
    wherein the control circuit is operable to open the first electronic switch, and when the AC input power is interrupted, the control circuit causes the first electronic switch to be opened and the extended hold-up circuit functions as a boost converter in constant voltage mode to release energy from the extended holdup capacitor to the bulk capacitor, and when the AC input power is restored, the first electronic switch is closed and the extended hold-up circuit functions as a buck converter to charge the extended hold-up capacitor in a constant current mode, wherein a re-rush current is reduced due to the operation of the extended holdup circuit as the buck converter.

2. The power supply of claim 1, wherein when the first electronic switch is open, the extended hold-up circuit releases energy from the extended hold-up capacitor in a constant voltage mode.

3. The power supply of claim 1, wherein the first terminal is a first drain, the second terminal is a first source and the third terminal is a first gate of the first electronic switch.

4. The power supply of claim 1, wherein the extended hold-up circuit further comprises:
    a second electronic switch having a second gate, a second source and a second drain, the second drain coupled to the output terminal of the power factor correction circuit; and
    a third electronic switch having a third gate, a third source and a third drain, the second source and the third drain being coupled to each other at a first node, the second gate and the third gate coupled to the digital signal controller.

5. The power supply of claim 4, further comprising:
    a first inductor coupled between the first node and the extended hold-up capacitor.

6. The power supply of claim 1, wherein the extended hold-up circuit further comprises:
    a second electronic switch having a second gate, a second source and a second drain;
    a third electronic switch having a third gate, a third source and a third drain, the second source and the third drain being coupled to each other at a first node; and
    a fourth electronic switch having a fourth gate, a fourth source and a fourth drain, the second gate, the third gate and the fourth gate coupled to the digital signal controller, the third source and the fourth source coupled to each other.

7. The power supply of claim 6, further comprising:
    a diode and an inductor coupled in series between the second drain and ground.

8. The power supply of claim 1, wherein the extended hold-up circuit further comprises:
    a second electronic switch having a second gate, a second source and a second drain;
    a third electronic switch having a third gate, a third source and a third drain, the second gate and the third gate coupled to the digital signal controller, the second source and the third drain being coupled to each other at a first node; and
    a first diode having an anode and a cathode, the anode coupled to the third source, and the cathode coupled to an input terminal of the power factor correction circuit.

9. The power supply of claim 8, further comprising:
    a diode and an inductor coupled in series between the second drain and ground.

10. An information handling system (IHS) comprising:
    a processor; and a power supply for providing power to the IHS, the power supply comprising;
  a rectifier circuit that receives alternating current (AC) input power;
  a power factor correction circuit coupled to output terminals the rectifier circuit, the power factor correction circuit including a bulk capacitor;
  an extended hold-up capacitor coupled in parallel to the bulk capacitor, via a first electronic switch, the first electronic switch having a first terminal coupled to the bulk capacitor and a second terminal coupled to the extended hold-up capacitor, wherein a charge stored in the hold-up capacitor may be applied to extend the operation of the circuit in the event where power is reduced or interrupted, and further to reduce re-rush current when AC input power is restored;
  a control circuit coupled to a third terminal of the first electronic switch, the control circuit operable to control the operation of the first electronic switch;
  an extended hold-up circuit comprising the extended hold-up capacitor and coupled to an output terminal of the power factor correction circuit; and
  a digital signal controller coupled to the extended hold-up circuit, the digital signal controller operable to control the operation of the extended hold-up circuit;
  wherein the control circuit is operable to open the first electronic switch, and when the AC input power is interrupted, the control circuit causes the first electronic switch to be opened and the extended hold-up circuit functions as a boost converter in constant voltage mode to release energy from the extended holdup capacitor to the bulk capacitor, and when the AC input power is restored, the first electronic switch is closed and the extended hold-up circuit functions as a buck converter to charge the extended hold-up capacitor in a constant current mode, wherein a re-rush current is reduced due to the operation of the extended holdup circuit as the buck converter.

11. The information handling system of claim 10, wherein the extended hold-up circuit further comprises:
  a second electronic switch having a second gate, a second source and a second drain, the second drain coupled to the output terminal of the power factor correction circuit;
  a third electronic switch having a third gate, a third source and a third drain, the second source and the third drain being coupled to each other at a first node, the second gate and the third gate coupled to the digital signal controller; and
  a first inductor coupled between the first node and the extended hold-up capacitor.

12. The information handling system of claim 10, wherein the extended hold-up circuit further comprises:
  a second electronic switch having a second gate, a second source and a second drain;
  a third electronic switch having a third gate, a third source and a third drain, the second source and the third drain being coupled to each other at a first node;
  a fourth electronic switch having a fourth gate, a fourth source and a fourth drain, the second gate, the third gate and the fourth gate coupled to the digital signal controller, the third source and the fourth source coupled to each other; and
  a diode and an inductor coupled in series between the second drain and ground.

13. The information handling system of claim 10, wherein the extended hold-up circuit further comprises:
  a second electronic switch having a second gate, a second source and a second drain;
  a third electronic switch having a third gate, a third source and a third drain, the second gate and the third gate coupled to the digital signal controller, the second source and the third drain being coupled to each other at a first node;
  a first diode having an anode and a cathode, the anode coupled to the third source and the cathode coupled to an input terminal of the power factor correction circuit; and
  a diode and an inductor coupled in series between the second drain and ground.

14. A power supply comprising:
  a rectifier circuit that receives alternating current (AC) input power;
  a power factor correction circuit coupled to an output of the rectifier circuit, the power factor correction circuit including a bulk capacitor;
  an extended hold-up capacitor coupled in parallel to the bulk capacitor, via a first electronic switch, the first electronic switch having a first terminal coupled to the bulk capacitor and a second terminal coupled to the extended hold-up capacitor; and
  an extended hold-up circuit comprising the extended hold-up capacitor and coupled to an output terminal of the power factor correction circuit, wherein when the first electronic switch is closed, the extended hold-up circuit charges the extended hold-up capacitor in a constant current mode;
  wherein when the AC input power is interrupted, the first electronic switch opens and the extended hold-up circuit functions as a boost converter in constant voltage mode to release energy from the extended holdup capacitor to the bulk capacitor, and when the AC input power is restored, the first electronic switch closes and the extended hold-up circuit functions as a buck converter to charge the extended hold-up capacitor in a constant current mode, wherein a re-rush current is reduced due to the operation of the extended holdup circuit as the buck converter.

15. The power supply of claim 14, wherein:
  when the first electronic switch is open during a loss of AC power, the extended hold-up circuit releases energy from the extended hold-up capacitor in a constant voltage mode such that a hold-up time of the power supply is extended, and when power resumes after being lost, a re-rush current is reduced due to operation of the extended holdup circuit as the buck converter.

16. A method for providing an extended hold-up time and reducing re-rush current for a power supply of an electronic device, the method comprising:
  providing a rectifier circuit that receives alternating current (AC) input power;
  coupling a power factor correction circuit to output terminals of the rectifier circuit, the power factor correction circuit including a bulk capacitor;
  coupling an extended hold-up capacitor in parallel to the bulk capacitor, via a first electronic switch, the first electronic switch having a first terminal coupled to the bulk capacitor and a second terminal coupled to the extended hold-up capacitor;
  coupling a control circuit to a third terminal of the first electronic switch, the control circuit operable to control the operation of the first electronic switch;

coupling an extended hold-up circuit comprising the extended hold-up capacitor to an output terminal of the power factor correction circuit;

coupling a digital signal controller to the extended hold-up circuit, the digital signal controller at least partially controlling the operation of the extended hold-up circuit; and coupling a DC to DC converter to the extended hold-up circuit;

wherein when the first electronic switch is open during a loss of AC power, the extended hold-up circuit operates as a boost converter and releases energy from the extended hold-up capacitor in a constant voltage mode such that a hold-up time of the power supply is extended and when the first electronic switch is closed following a return of AC power, the extended hold-up circuit operates as a buck converter and charges the extended hold-up capacitor in a constant current mode and a re-rush current is reduced due to the operation of the extended holdup circuit as the buck converter.

17. The method of claim 16, wherein when the first electronic switch is open, the extended hold-up circuit releases energy from the extended hold-up capacitor in a constant voltage mode.

* * * * *